Figure 1:
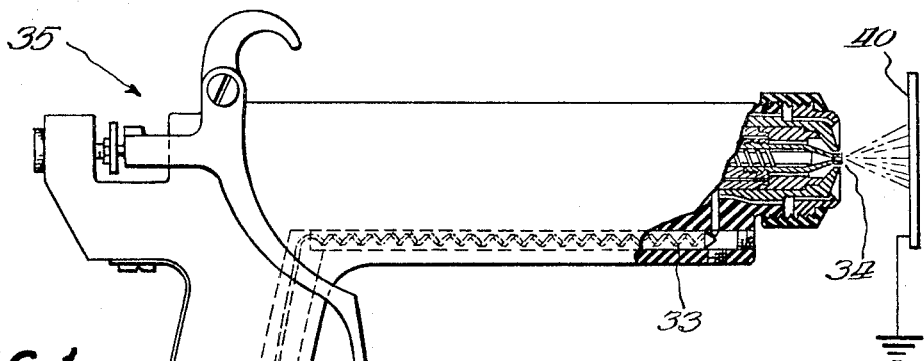

Sept. 13, 1966      W. G. FISCHER      3,273,015

ELECTROSTATIC SPRAY GUN SYSTEM

Filed April 29, 1963

Inventor:
Warren G. Fischer
By Robert L. Kahn
Attorney

United States Patent Office 3,273,015
Patented Sept. 13, 1966

3,273,015
ELECTROSTATIC SPRAY GUN SYSTEM
Warren G. Fischer, Elmhurst, Ill., assignor to H. G. Fischer & Co., Franklin Park, Ill., a corporation of Illinois
Filed Apr. 29, 1963, Ser. No. 276,442
2 Claims. (Cl. 317—3)

This invention relates to an electrical apparatus and more particularly to an electrostatic coating system. Electrostatic coating systems include a power supply, a cable between the power supply and a coating discharge or atomizing means. The power supply is of the high voltage low current variety and provides a uni-directional current of a few milliamperes at a voltage, ranging from about 40,000 volts to as much as 100,000 volts, depending upon the type of system and the manner of use. The power supply is generally a separate package which is at a distance from the coating discharge or atomizing means.

The cable between the power supply and the coating discharge or atomizing means, which may be a spray gun as an example, is generally a flexible cable having a length of the order of at least about 20 feet. This cable must be insulated for the full voltage of the power supply. In order to protect personnel against danger of shocks, the cable includes a grounding layer layer of metal. As a rule, the cable consists of a central copper conductor, consisting of one or more wires, disposed within a flexible tube of polyethylene insulation usually having a wall thickness of about 1/4". The outer diameter of the polyethylene tube generally is about 1/2" or 5/8", with a bore therein of from 1/16" to 1/8" in diameter to accommodate the wire. Immediately outside of the polyethylene tube is disposed braided copper grounding layer and outside of the grounding layer there is disposed an outer layer of tough plastic to protect the cable structure from abrasion, grease and moisture.

The cable described above has a definite capacitance per foot depending upon the cable constants. Because polyethylene has a high dielectric constant, the value of the cable capacitance is substantial. This invention incorporates the cable capacitance into the power supply so that the cable is more than a mere electrical connecting link between an otherwise complete power supply and the spray gun. The invention generally contemplates a power supply system of the type having voltage doubling means, said voltage doubling means including the cable capacitance as an active element of the power supply.

Voltage doubling systems involve a combination of rectifying means, and at least two capacitors so connected that each capacitor is charged by the rectified half waves. The capacitors are so connected that insofar as voltage doubling output is concerned, they are in series to provide an output voltage which is the sum of the voltages across each of the component capacitors. A voltage doubling system of this character will function providing that the current drain on the capacitors is small in comparison to the charge retained by the capacitors. This permits the voltage across the capacitors to be maintained during operation.

A system embodying the present invention has the advantages of economy and simplicity. The economy comes into being by the fact that the high voltage step-up transformer which is required in electrostatic coating systems for operating the same need only generate about half of the voltage which the system normally requires. Even if a conventional system uses voltage doubling means, a separate capacitor would be required, with the cable functioning purely as a connecting wire. Thus a system embodying the present invention has the advantage of being cheaper insofar as first cost is concerned and being much more efficient, since the capacitance of the cable which is present, whether desired or not, is actually utilized as a power supply operating element in the entire system.

Figure 2:
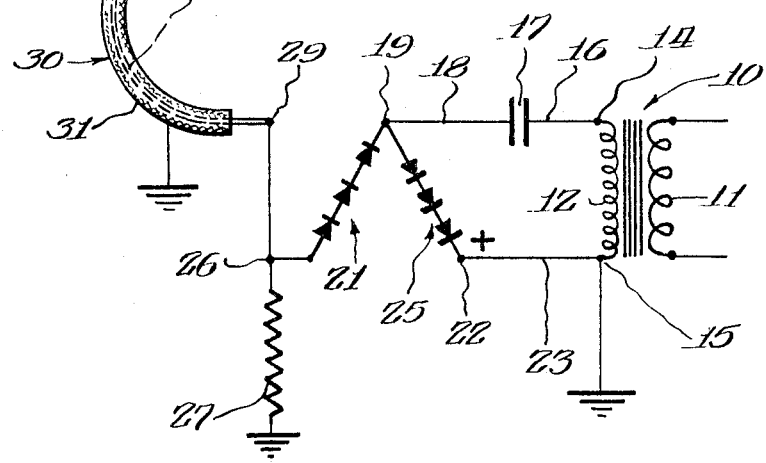
Figure 2:
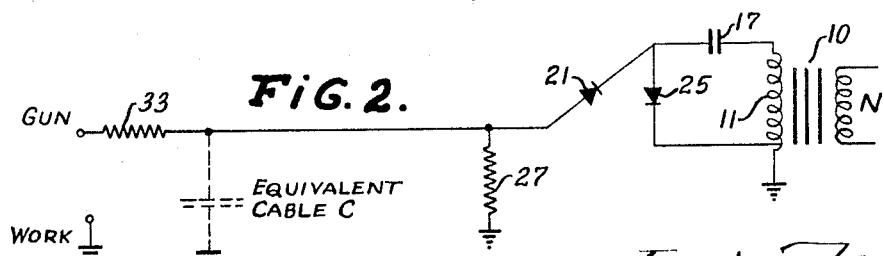

In order that the invention may be fully understood, it will now be disclosed in connection with the drawing wherein FIG. 1 is a diagrammatic illustration of a system embodying the present invention, and FIG. 2 shows an equivalent circuit representation of the system.

In the drawing, transformer 10 is a more or less conventional transformer having an iron core provided with primary winding 11 and secondary winding 12. Primary winding 11 is adapted to be connected to a conventional source of alternating current such as a 60-cycle, 120 or 240 power line. As a rule, the primary will be connected to suitable circuit breakers and overload relays and the like, all being well known in the art.

Trfansformer 10 is of the step-up variety so that secondary 12 has a large number of turns for the purpose of stepping the primary voltage up to substantially one-half of the voltage required for operating an electrostatic coating system. As an example, the electrostatic coating system may be designed to operate at about 100,000 volts. This means, therefore, that the secondary voltage across winding 12 will be between about 35,000 and about 40,000 volts R.M.S., this providing something over about 50,000 volts peak. Transformer 10 has high leakage reactance for the purpose of providing poor voltage regulation with increase in current drawn from the secondary. The poor regulation is for the purpose of cutting down the output voltage with increase in load current to reduce danger of shock.

Secondary winding 12 has terminals 14 and 15, the latter being grounded. In practice, secondary terminal 15 may be connected to ground through the winding of an overload relay.

Terminal 14 of secondary winding 12 is connected by wire 16 to one terminal of capacitor 17, the other terminal of which is connected by wire 18 to junction point 19. Insofar as capacitor 17 is concerned, this may be either one capacitor or may be a number of capacitors in series or in parallel. For the purpose of the present invention, capacitor 17 may be considered as a single capacitor.

Junction point 19 has connected thereto one or more rectifiers 21 in series, if more than one is used, these rectifiers being connected to junction point 22 which is connected by wire 23 to ground.

As illustrated here, the polarity of the rectifier or series of rectifiers 21 between junction points 19 and 22 is such that junction point 22 is positive with respect to junction point 19. Returning to junction point 19, additional rectifier or rectifiers 25 are connected between junction point 19 and junction point 26. Rectifier or rectifiers 25 are connected in such a manner that junction point 19 is positive with respect to junction point 26. In other words, junction point 19 is, insofar as voltage is concerned, midway between the voltages of junction points 26 and 22, assuming the system is in normal operation. Referring to junction point 26, bleeder resistor 27 is connected between this junction point and ground. Bleeder resistor 27 will have a high value in the order of 200 or 250 megohms to permit the potential to be maintained.

Returning to junction point 26, this is connected to terminal 29 of cable 30, whose general structure has previously been described. Cable 30 has conducting outer grounded sheath 31, while inner conductor 32 is connected through limiting resistor 33 to discharge tip 34 of spray gun 35. Spray gun 35 may have any desired structure but preferably is of the type having no metal charged at high potential exposed to atmosphere except for discharge point or edge 34. Spray gun 35 may have the structural features disclosed in United States Patent No. 3,056,557, or may involve other structural features, but preferably providing the general structure in the patent referred to above (where minimum exposure of highly charged metal to atmosphere is provided) is used. However, it is to be understood that the invention is not necessarily limited to any particular type of spray gun or, in fact, any particular type of gun or coating discharge or atomizing means. Work 40 for receiving the coating material is grounded.

In the design of a system, the value of capacitor 17, resistor 27 and the capacitance of cable 30 will be selected so that the potential available at tip 34, is maintained at substantially double the potential developed across the terminals of secondary winding 12. The value of limiting resistor 33 may follow conventional practice but will preferably have a value of about two and one-half megohms per thousand volts.

While one example of a voltage doubling circuit using capacitors, resistors and rectifiers has been disclosed, it is understood that variations of the voltage doubling circuit are included within the scope of the invention providing that the capacitors necessary for the operation of such a circuit includes the capacitance of a cable.

What is claimed is:

1. In an electrostatic coasting system including a spray gun having a charging electrode for electrically charging coating material discharged by said gun, the combination of a step-up transformer having a primary winding for energization from an alternating current line, said transformer having a secondary winding, a voltage doubling system having two input terminals connected to the two terminals of said secondary winding, said secondary winding having one terminal grounded and the other terminal at high potential and said coating system including a grounded portion comprising the work to be coated, said voltage doubling system including a first capacitor connected between the high potential secondary winding terminal and a first junction point, one rectifier means connected between said first junction point and ground, a second rectifier means connected between said first junction point and a second junction point, said two rectifier means being properly poled for voltage doubling action, a bleeder resistor connected between said second junction point and ground, a coaxial cable having dielectric material between the central conductor and the outer conductor, a direct connection between said outer conductor and ground, a direct connection between one end of said central conductor and said second junction point, the remaining terminal of said central conductor and ground constituting the output terminals of the voltage doubler system, a connection between the remaining terminal of said central conductor and the gun charging electrode, the cable capacitance functioning as a second capacitor in the voltage doubling system whereby a substantial length of cable for manipulation of said gun in connection with coating operations may be used.

2. In an electrostatic coating system including a spray gun having a charging electrode for electrically charging coating material discharged by said gun, the combination of a step-up transformer having a primary winding for energization from an alternating current line, said transformer having a secondary winding, a voltage doubling system having two input terminals connected to the two terminals of said secondary winding, said secondary winding having one terminal grounded and the other terminal at high potential and said coating system including a grounded portion comprising the work to be coated, said voltage doubling system including a first capacitor connected between the high potential secondary winding terminal and a first junction point, one rectifier means connected between said first junction point and ground, a second rectifier means connected between said first junction point and a second junction point, said two rectifier means being properly poled for voltage doubling action, a bleeder resistor connected between said second junction point and ground, a coaxial cable having dielectric material between the central conductor and the outer conductor, a direct connection between said outer conductor and ground, a direct connection between one end of said central conductor and said second junction point, a limiting resistor connected between the remaining terminal of said central conductor and the gun charging electrode, said bleeder resistor having a substantially higher value than the limiting resistor and the capacitance existing between the central conductor of said cable and ground functioning as a second capacitor in the voltage doubling system whereby a substantial length of cable for manipulation of said gun in connection with coating operations may be used.

References Cited by the Examiner

UNITED STATES PATENTS

| | | | |
|---|---|---|---|
| 2,390,839 | 12/1945 | Klingaman. | |
| 2,693,535 | 11/1954 | White | 321—15 X |
| 2,854,639 | 9/1958 | Nordlin | 174—102 X |
| 2,926,106 | 2/1960 | Gauthier | 239—15 X |
| 3,056,557 | 10/1962 | Walberg | 118—629 X |
| 3,167,255 | 1/1965 | Point | 317—3 X |

OTHER REFERENCES

Basic Electronics, Navy Training Courses (NAVPERS 10,087), U.S. Gov't. Printing Office, 1955, page 144.

MILTON O. HIRSHFIELD, *Primary Examiner.*

SAMUEL BERNSTEIN, *Examiner.*

J. A. SILVERMAN, *Assistant Examiner.*